Figure 1:
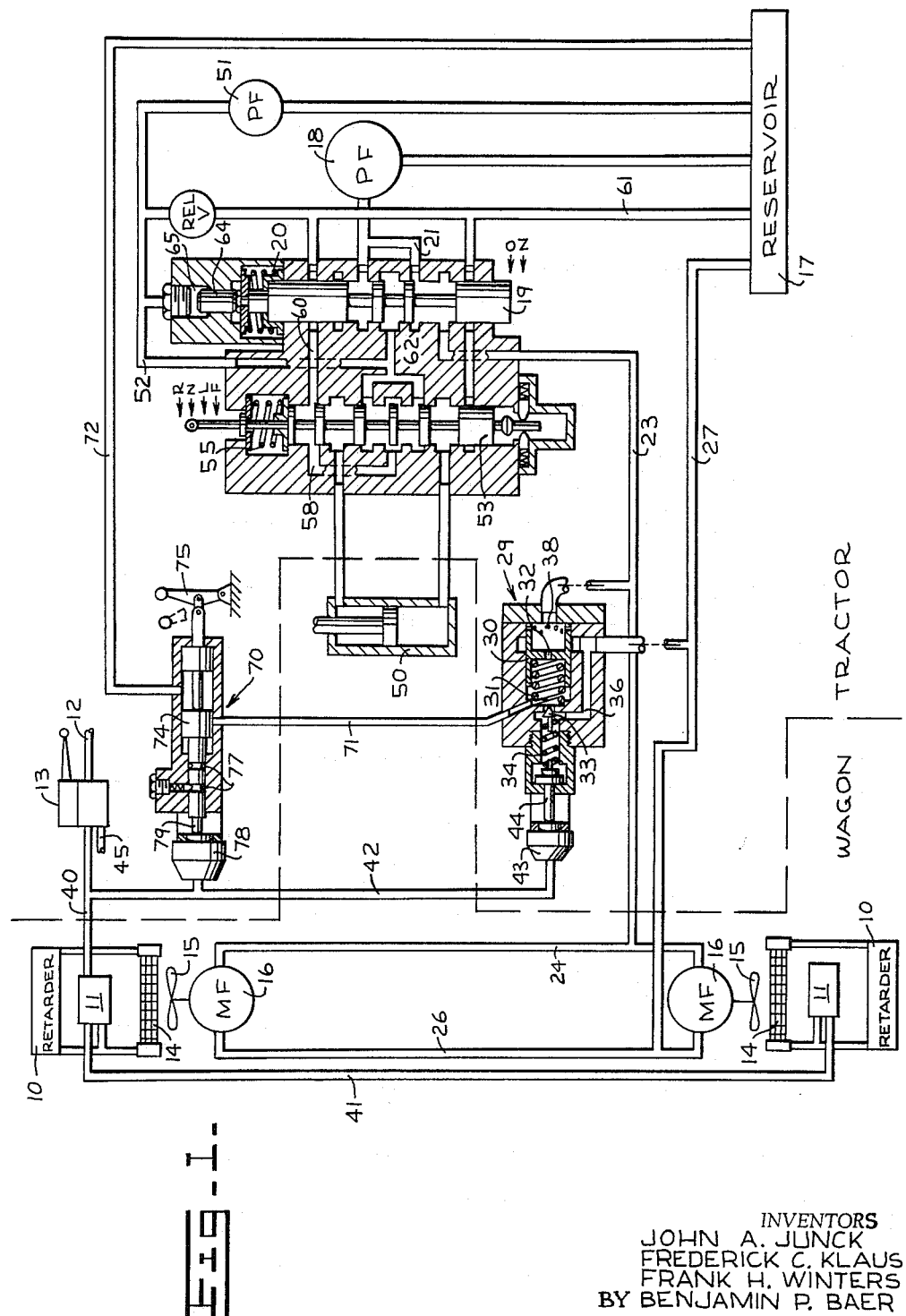

Nov. 16, 1965   J. A. JUNCK ET AL   3,218,106
HYDRAULIC CIRCUIT FOR DRIVE MOTORS FOR RETARDER COOLING FANS
Filed Oct. 4, 1963   2 Sheets-Sheet 1

INVENTORS
JOHN A. JUNCK
FREDERICK C. KLAUS
FRANK H. WINTERS
BY BENJAMIN P. BAER
ATTORNEYS

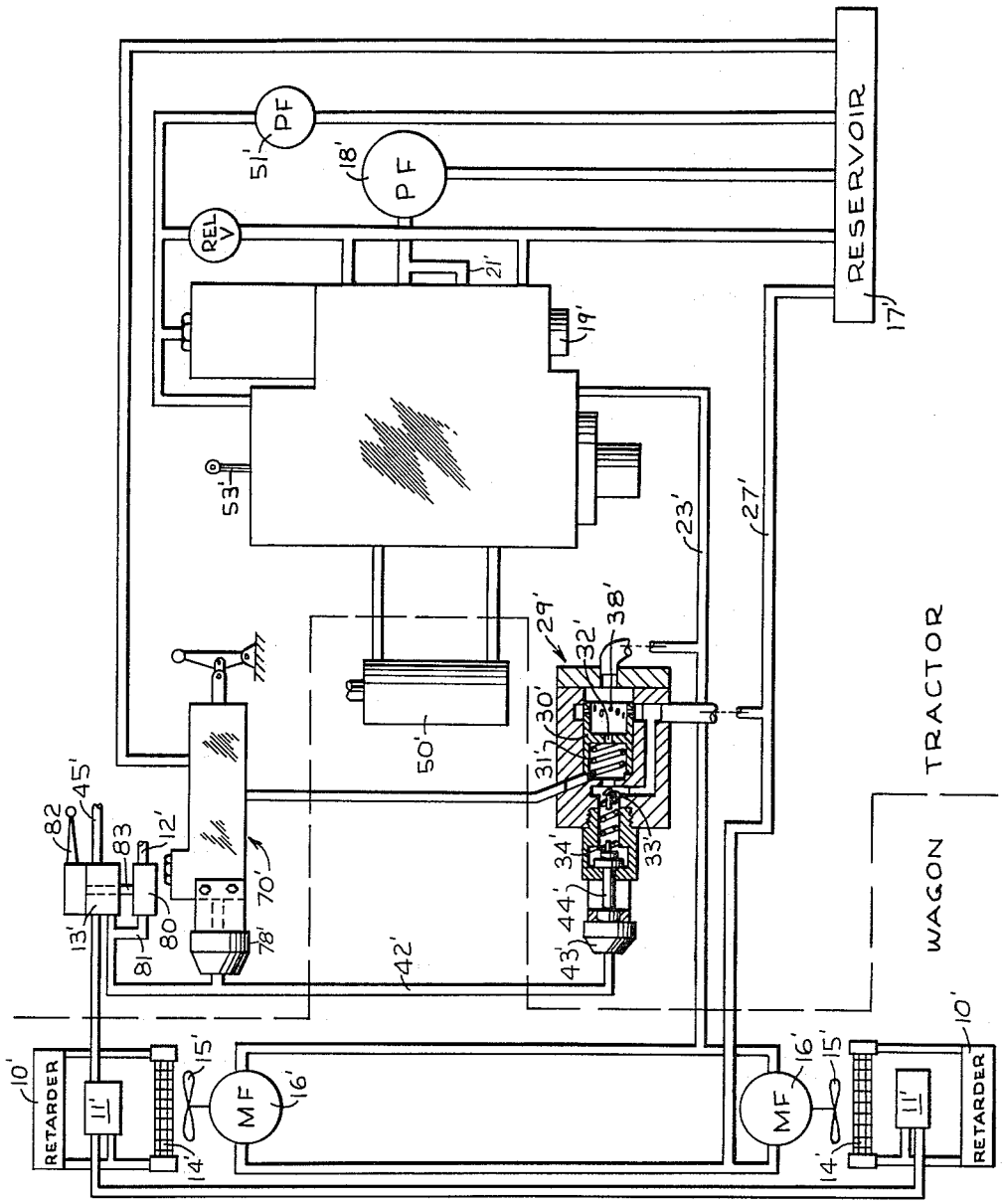

United States Patent Office 3,218,106
Patented Nov. 16, 1965

3,218,106
HYDRAULIC CIRCUIT FOR DRIVE MOTORS FOR RETARDER COOLING FANS
John A. Junck, Joliet, Frederick C. Klaus, Lockport, Frank H. Winters, Joliet, and Benjamin P. Baer, Washington, Ill., assignors to Caterpillar Tractor Co., Peoria, Ill., a corporation of California
Filed Oct. 4, 1963, Ser. No. 313,985
8 Claims. (Cl. 303—6)

This invention relates to a hydraulic circuit which provides power for operating cooling fans employed for cooling the fluid employed in the fluid retarders used for retarding speed of a large vehicle.

Fluid retarders are now employed on large vehicles to augment braking. The fluid in such retarders absorbs the inertial energy of the moving vehicle creating heat which is dissipated in a heat exchanger often with the aid of a fan to increase the rate of absorption by the atmosphere. In large tractor-trailer combinations, such for example as a tractor and wagon drawn thereby, the retarders and heat exchangers may be positioned near the rear of the wagon with the source of power for actuating fans disposed on the tractor. It is desirable to drive the fans with fluid motors because of the availability of fluid under pressure on the tractor and the relative inconvenience of using electric or mechanical drives. Since fluid under pressure from an engine driven pump on the tractor is used for other purposes where the demand for pressure and volume is great, it is desirable that it be employed in driving the cooling fans only in proportion to the need for cooling. Also when a large quantity of fluid is temporarily required as in actuating jacks to raise the dump body of a wagon, it is desirable to de-energize the fans so that pump volume required to drive them may be diverted to the jack circuit.

It is, therefore, an object of the present invention to provide a fluid circuit for retarder cooling fans with means to provide a high speed drive when the retarder is energized and a low speed drive when it is de-energized.

Another object of the invention is to provide in combination a circuit for actuating retarder fans and a circuit for actuating a mechanical component with means operable upon use of the component circuit to de-energize the fan circuit thus conserving power for the operation of the component.

Another object of the invention is to provide a valve for venting the retarder fan circuit where the retarders are not expected to be used for a long period of time and means operable automatically to close the vent upon activation of the retarders.

A still further object of the invention is to provide a fluid circuit for retarder cooling fans with means to initiate drive when the rearder is energized and to discontinue drive when it is de-energized.

Still further and more specific objects and advantages of the invention and the manner in which it is carried into practice are made apparent in the following specification wherein reference is made to the accompanying drawings.

In the drawings:

FIG. 1 is a schematic view of a combined and interconnected retarder fan drive circuit and vehicle component actuating circuit embodying one form of the present invention; and FIG. 2 is a schematic view of the fan drive circuit and component actuating circuit similar to FIG. 1 but embodying an alternate form of the present invention.

Referring now to FIG. 1, those components of the system mounted on the tractor are shown on the right hand side of the broken line which intersects the view and those components on the wagon or trailer are shown on the left hand side of the broken line. A pair of fluid retarders are schematically shown at 10 to be driven by the wheels or axles of the wagon (not shown). The retarders are charged by load cylinders 11 which contain liquid which is forced into the retarders by air from a source of supply (not shown) entering the line 12 and controlled by a valve 13. When the retarders are in operation, the liquid in them is circulated thorugh a heat exchanger 14, one for each retarder, to dissipate the heat and, in the present case, fans 15 actuated by fluid motors 16 contribute to the efficiency of the heat exchangers. The fluid motors 16 are driven with a fluid from a reservoir 17 pressurized by a fluid pump 18 and driven through a valve having a spool 19. The valve is shown in its normal or open position in which it is held by a conventional spring 20 so that fluid under pressure from the pump entering the valve through a line 21 flows through a line 23 and a branch line 24 to both of the fluid motors which drive the fans. Return fluid from the motors passes through a line 26 and a common line 27 to the reservoir.

Since this is the normal low-speed fan operation intended for use when the retarders are not in actual operation but may be operated frequently, the pressure in the system is limited by a relief valve, generally indicated at 29, disposed in a line which connects the pressure line 23 with the return line 27. The relief valve comprises a slidable piston or valve element 30 biased toward the right or to the closed position shown by a spring 31. An orifice 32 in the valve element admits high pressure flow to the spring chamber so that pressures are balanced on opposite sides of the valve and it is normally held closed only by the pressure of the spring 31. Opening of the relief valve is controlled by a pilot valve 33 closing an orifice which vents the chamber of spring 31 and normally held closed by a smaller spring 34. When pressure in the line 23 exceeds a predetermined value, say 500 p.s.i., it will open the pilot valve, bleeding pressure from the chamber of spring 31 through a passage 36 and to the return line 27. The discharge of such fluid from the relief valve takes place through a plurality of orifices shown at 38. Thus with the retarders not in operation, the pressure to the fluid motors driving the fan is limited so that the cooling fans are driven at a relatively low speed, say 1500 r.p.m. and the power required for driving them at a high speed is not wasted.

High speed operation of the cooling fan is accomplished automatically when the retarders are placed in operation by manipulation of the control valve 13. The control valve 13 admits air under pressure to the load cylinders 11 to increase the volume and pressure of fluid in the retarders so that they exert a retarding or braking effect on the wheels of the wagon. Air entering the load cylinders through lines 40 and 41 is communicated through a line 42 to an air cylinder 43 where it is effective to advance a piston 44 toward the right as shown in the drawing. This piston has an end which forms a seat for the spring 34 of the pilot valve and thus loads or compresses the spring to a point where much greater pressure is required in the line 23 to open the relief valve. Consequently a pressure of approximately 2,000 p.s.i. may be maintained in the fan drive circuit effecting operation of the fans at approximately 3,000 r.p.m. Thus while the retarders are energized, the cooling fan speed is automatically increased to draw a greater volume of air through the heat exchangers and effect faster dissipation of heat from the retarder cooling oil. When the retarder control valve is closed, pressure to the retarders as well as to the relief valve 29 is vented to atmosphere through an exhaust shown at 45 and consequently the relief valve immediately assumes its lower pressure relief setting.

A fluid motor or double acting jack employed for raising and lowering a dump body on the wagon is illustrated at 50 and is actuated by fluid from the reservoir 17 pressurized by a fluid pump 51 and directed as by a line 52 to a control valve having a spool 53 which may be contained in the same housing as the spool 19. The control valve with the spool 53 is generally of conventional construction for use with double acting hydraulic jacks and has a raise, a neutral, a lower and a float position. This spring assembly 55 normally holds the spool in the neutral position with no communication of pressurized fluid to either end of the jack and no communication of fluid between opposite ends of the jack, fluid under pressure from the pump 51 being returned to the reservoir through a passage 58, a passage 60 and a line 61.

Since the combined volumes of pumps 18 and 51 are required for satisfactory speed of operation of a wagon dump body being raised by the jack 50, the spool 19 is automatically moved to its neutral position which is downwardly from the position shown so that the fluid from pump 18 is directed through the valve with the spool 19 and into the inlet of the valve controlled by the spool 53, this inlet being shown at 62. To accomplish this, a piston 64 is disposed in abutment with the end of the spool 19 and has its opposite end in a chamber 65 which is in communication with the line 52. Thus when the jack control spool 53 is moved to its raise position and a pressure increase takes place in the line 52, the same pressure is communicated to the upper end of the piston 64 moving it downwardly to adjust the valve spool 19 from its normal open position to its neutral position. This condition continues while the dump body is being raised and until pressure is reduced in the line 52 when the spring 20 will return the valve spool 19 to its open or fan operating position.

When the dump body is being lowered under normal conditions, the output of the pump 18 is not required because the weight of the body moves the jack piston downwardly and there is little or no build up of pressure in the line 52. However in extraordinary conditions, for example when the wagon is on a steep incline and the raised body is in an overcenter position, considerable force may be required to lower it. In this event, pressure will build up in the line 52 again to act upon piston 64 and move the spool 19 to a position where output of the pump 18 is again directed to the jack, in this case to the rod end thereof, to force the dump body toward its lowered position.

There are instances where a tractor and wagon may operate for extended periods of time where very little braking or retarding is necessary, such for example on level terrain, and it is desirable in such instances to conserve the horsepower required for the otherwise nearly constant operation of the fan even at low speed. For this reason, a manual control is provided which vents the chamber of spring 31 in the relief valve 29 and this being a very weak spring, only slight pressure in the line 23 is required to overcome its force and open the valve element 30. This effects return of fluid through the return line 27 with insufficient force reaching the fan motors to operate them. To accomplish this, a vent valve, generally indicated at 70, forms communication between a line 71 from the chamber of spring 31 and the line 72 which returns to the reservoir. The vent valve is normally closed, as shown in full lines, with a part 74 of a sliding spool therein closing the line 71. When a control lever 75 of the vent valve is moved toward the left or to the dotted line position shown, the spring chamber is vented and the fan motors are no longer driven. The spool of the vent valve is held in either of the positions described by a spring actuated detent registering with either of a pair of grooves 77 in the spool. In order to prevent operation of the retarders with the cooling fans disabled in the manner just described, an air cylinder 78 is associated with the vent valve 70 and has a piston 79 engaging the end of the spool thereof. Thus when the control valve for the retarders is open, air under pressure in line 42 is communicated to the cylinder 78 moving the vent valve from its open position to the closed position shown and the retarders will not be operated without adequate cooling.

Under some circumstances it has been found that continuous cooling of the retarder oil, even at reduced fan speed, resulted in an excessively low oil temperature. Since viscosity varies inversely with temperature, this results in a substantial horsepower loss due to the high viscosity of the oil which is circulated through the de-energized retarder for lubrication. Under such circumstances, an additional safety feature, as shown in FIG. 2, may be employed to provide drive of the cooling fans when the retarder is energized and to discontinue this drive when the retarder is de-energized. Components of the circuit shown in FIG. 2, corresponding with components of FIG. 1, are identified by similar reference characters with the addition of a prime (') mark. Those components whose function and construction are unchanged over that shown in FIG. 1, such as valve 70', jack 50' and the housing of spools 19' and 53', are shown in elevation for simplification of the drawing.

As shown in FIG. 2, the output of pump 18' is directed through lines 21' and 23' to the inlet of relief valve 29' and to the motors 16'. When the retarder control valve 13' is in the off position, communicating load cylinder 11' and air cylinders 43' and 78' to the atmosphere through an exhaust line 45', the piston rod 44' will be in its retracted position. Since the free length of spring 34' is not sufficient to exert a load on pilot valve 33' when the piston rod 44' is retracted, the pilot valve 33' will open as shown to vent the chamber of a spring 31'. This permits plunger 30' to move to an open position as shown under the influence of the pressure differential created by flow through orifice 32' to communicate line 23' with return line 27' through a plurality of orifices 38'. The force of spring 31' is not great enough to create a pressure sufficient to drive the motors 16', therefore, drive of fans 15' is not provided when the retarders are de-energized.

It has also been found that approximately 5 p.s.i. air pressure is required to extend piston rod 44' of cylinder 43' to load spring 34' and establish sufficient pressure for driving the fans 15'. This 5 p.s.i. air pressure is sufficient to partially energize the retarders and could result in damage to the system from excessive heat. For this reason it is desirable that a means be provided to establish a pressure in the circuit sufficient to drive the fans 15' prior to energizing of the retarders. In order to accomplish this, an auxiliary air valve 80 is provided in the air supply line 12' and communicates through a line 81 with valve 13' and line 42'. Auxiliary valve 80 is mechanically connected to a control lever 82 of valve 13' by a suitable linkage as illustrated at 83 such that initial movement of lever 82 opens auxiliary valve 80 to supply full system air pressure to valve 13' and cylinder 43'. This extends piston rod 44' to compress spring 34' and close pilot valve 33' to block communication between the chamber of spring 31' and return line 27'. As pressure on opposite sides of plunger 30' equalizes through orifice 32' spring 31' urges plunger 30' to a closed position, blocking communication between lines 23' and 27'. In this manner pressure is established in line 23' to drive motors 16' and roatate fans 15' to cause air to flow through heat exchangers 14'. Continued movement of lever 82 opens valve 13' to admit air to load cylinders 11' for energizing retarders 10' to retard speed of the vehicle. In this manner, positive drive of fans 15' is provided prior to energizing of retarders 10' to prevent excessive heating of the retarder system.

While the foregoing description has been directed to the invention in its application to a tractor and dump wagon, it is obviously not so limited but is readily adaptable to use with vehicular equipment in other forms and combinations.

It is also recognized that other forms of energy absorbing devices such as, for example, conventional fluid cooled friction braking mechanisms may be employed in place of the fluid retarders illustrated in the drawings and heretofore described.

We claim:

1. In vehicular equipment having a fluid retarder, a fan for cooling retarder fluid and a fluid motor for driving the fan, a source of fluid under pressure, means normally directing a limited volume of fluid under pressure to the fan motor, a circuit for air under pressure to charge the retarder, means operable automatically upon charging the fluid retarder for increasing the volume of fluid directed to the fan motor, a spring loaded relief valve normally relieving fluid under pressure directed to the fan motor, and means actuated by the air directed to the retarder for increasing the load of the relief valve spring.

2. The combination of claim 1 with a vent for fluid pressure in the fan motor circuit, and a manually actuated valve normally closing said vent and operable to prevent operation of the fan.

3. The combination of claim 2 with means actuated by pressure in said circuit to close the vent valve to insure against operation of the retarder without operation of the fan.

4. In vehicular equipment having a fluid retarder with cooling means including a fluid motor driven fan and an adjustable vehicle component with a fluid motor driven actuating means, a source of fluid under pressure, a circuit including valve means to direct fluid from said source to the fan motor, valve means to direct fluid from said source to the component motor, a circuit for air under pressure to charge the retarder, and means operable automatically upon opening of the component motor valve and pressure rise in the component circuit to close the fan motor valve whereby all pressure in the circuit will be available to the component motor.

5. The combination of claim 4 in which the fan motor valve is normally open.

6. The combination of claim 5 in which the pressure of fluid to the fan motor is relieved at a low value when the retarder is not in operation, and means to increase the value of pressure relief when the retarder is charged.

7. In vehicular equipment having a retarding system comprising an energy absorbing device with cooling means including a fluid motor driven fan and an adjustable vehicle component with a fluid motor driven actuating means, a source of fluid under pressure, a circuit including valve means to direct fluid from said source to the fan motor, valve means to direct fluid from said source to the component motor, and means operable automatically upon opening of the component motor valve and pressure rise in the component circuit to close the fan motor valve whereby all pressure in the ciruit will be available to the component motor.

8. In vehicular equipment having a retarding system including a fluid cooled energy absorbing device and a heat exchanger, a fan for moving air through the heat exchanger and a fluid motor for driving the fan, a pump adapted to supply fluid under pressure from a reservoir, means for normally returning the fluid to the reservoir without effecting drive of the fan, a control for the energy absorbing device, and means responsive to actuation of said control to direct fluid under pressure to the fan motor prior to actuation of the energy absorbing device.

References Cited by the Examiner
UNITED STATES PATENTS

| | | | |
|---|---|---|---|
| 2,355,484 | 8/1944 | Teker | 188—264 |
| 3,101,815 | 8/1963 | Thompson et al. | 188—264 |

EUGENE G. BOTZ, *Primary Examiner.*